(12) United States Patent
Hong et al.

(10) Patent No.: US 12,472,866 B2
(45) Date of Patent: Nov. 18, 2025

(54) VEHICLE LAMP WITH A SEPARABLE MULTI-HOUSING

(71) Applicants: HYUNDAI MOTOR COMPANY, Seoul (KR); KIA CORPORATION, Seoul (KR)

(72) Inventors: Seung-Pyo Hong, Incheon (KR); Se-Jin Oh, Seoul (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 13 days.

(21) Appl. No.: 18/666,075

(22) Filed: May 16, 2024

(65) Prior Publication Data
US 2025/0196758 A1    Jun. 19, 2025

(30) Foreign Application Priority Data

Dec. 15, 2023    (KR) .................. 10-2023-0182939

(51) Int. Cl.
| | | |
|---|---|---|
| B60Q 1/26 | (2006.01) | |
| F21S 43/27 | (2018.01) | |
| F21W 103/20 | (2018.01) | |

(52) U.S. Cl.
CPC ............ B60Q 1/2626 (2013.01); F21S 43/27 (2018.01); *B60Q 2900/20* (2013.01); *F21W 2103/20* (2018.01)

(58) Field of Classification Search
CPC ... B60Q 1/2626; B60Q 2900/20; F21S 43/27; F21W 2103/20
See application file for complete search history.

(56) References Cited

U.S. PATENT DOCUMENTS

2021/0270440 A1*    9/2021  Kinoshita ............ F21S 41/255

FOREIGN PATENT DOCUMENTS

| | | |
|---|---|---|
| EP | 4166842 A1 | 4/2023 |
| KR | 20230052814 A | 4/2023 |

* cited by examiner

*Primary Examiner* — Anne M Hines
(74) *Attorney, Agent, or Firm* — Lempia Summerfield Katz LLC (57) ABSTRACT

A vehicle lamp with a separable multi-housing includes a housing that has a hole formation portion and a rear coupling portion on a rear surface of a housing body. The housing body has an internal space in which a module (e.g., an after-sale service target) is positioned and the internal space is covered by a lens. A light source unit can be securely held on the hole formation portion, and the module is taken out through the hole formation portion. The rear coupling portion is formed along an entire circumference of the hole formation portion at an edge of the housing body in such a manner as to have a protrusion structure. An operation of replacing the module can be performed through the hole formation portion. Particularly, a multi-housing can be coupled to the rear coupling portion using a replaceable housing meltable item, thereby covering the hole formation portion.

13 Claims, 6 Drawing Sheets

VEHICLE LAMP WITH A SEPARABLE MULTI-HOUSING

CROSS-REFERENCE TO RELATED APPLICATIONS

This application claims priority to Korean Patent Application No. 10-2023-0182939, filed on Dec. 15, 2023, which is incorporated herein by reference in its entirety.

BACKGROUND

Field

The present disclosure relates to a vehicle lamp, and more particularly, to a vehicle lamp with a multi-housing.

Description of Related Art

Typically, vehicle lamps are configured in such a manner that a housing surrounds a multiplicity of modules, including a lens and a light source, and built-in components of these modules, for protection. In recent years, according to a trend toward making the vehicle lamp larger, a multiplicity of built-in components have been configured as individual components (i.e., partial components) to facilitate lamp repair (i.e., an after-sale service operation).

As an example, the individual components (i.e., the partial components) includes a control component (for example, an IFS ECU, an ILCU, and a SIGNAL LAM), a fan, a lens sub-assembly, a primary light source module, and a housing sub-assembly, among other things. These partial components are categorized, according to the size of a hole cut in a housing, into two types: the first phase partial components and the second phase partial components. The first phase components include the IFS ECU, the ILCU, the signal lamp, and the fan that have a smaller size than the hole in the housing. The second phase components include the lens sub-assembly, the primary light source module, the signal light source module, and the housing sub-assembly that have a larger size than the hole in the housing.

Therefore, it is possible to perform the after-sale service operation on recent large-sized lamp through a front surface or rear surface of the housing according to the size of the partial component.

As an example, since the first phase partial component has a size smaller than the size of the hole, the after-sale service operation is performed through the rear surface of the housing.

Since the second phase partial component has a size larger than the size of the hole, the after-sale service operation is performed through the front surface of the housing. To this end, in order to melt a recycling-enabling hot meltable item used in a housing fastening portion between a lens and a housing, the recycling-enabling hot meltable item in the housing fastening portion is heated to high temperatures using a heating gun, thereby reducing adhesive force thereof. Then, the process begins with separating the lens from the housing.

Subsequently, after the after-sale service operation is performed, the lens and the housing are coupled to the housing fastening portion using the recycling-enabling hot meltable item. Unlike a typical hot meltable item that would cause the lens/housing to be discarded, the recycling-enabling hot meltable item, which is melted by high-temperature heating, is removed using a general-purpose tool. As a result, the lens/housing may be reused.

However, when one side (e.g., a housing heating portion) of the front surface of the housing is heated to high temperatures, the temperature of the other side (e.g., a housing non-heating portion) is relatively low. To prevent this phenomenon, overall heating of the housing fastening portion is desired. However, an issue regarding the overall heating of the housing fastening portion is the requirement for an after-sale service center to have a high-temperature chamber. In this case, the housing non-heating portion refers to the right side of the housing when the left side thereof is heated, refers to the left side of the housing when the right side thereof is heated, refers to the lower side of the housing when the upper side thereof is heated, and refers to the upper side of the housing when the lower side thereof is heated. In other words, when the left side of the housing is heated, the non-heating portion refers to the right side, and conversely, when the right side is heated, it refers to the left side of the housing.

In addition, during an after-sale service process, a coupling structure, such as a screw, that reinforces the holding force of a hot meltable item is first removed. Subsequently, the hot meltable item, which cures at a room temperature and has an increased holding force, is heated to temperatures ranging from 70 to 80 degrees Celsius.

Accordingly, an increase in the size of recent large-sized left and right sides-integrated meltable items increases the number of coupling structures, such as screws, that involve hot meltable items. Specifically, the region that needs to be heated to high temperatures expands.

SUMMARY

An object of the present disclosure, which is contrived to address the above-mentioned problem, is to provide a vehicle lamp with a separable multi-housing. The vehicle lamp is capable of enabling after-sale service operations to be performed from a rear surface of a housing. After-sale service operations involving the replacement of a component of the lamp can be performed without heating an entire recycling-enabling hot meltable item to high temperatures. Particularly, an after-sale service operation can be performed, from the rear surface of the housing, on a module having a larger size than a hole in a housing, particularly through a hole formation portion for securely holding a light source unit. The hole formation portion is formed on the housing. Thereafter, a separate housing is securely held on a coupling structure of an edge of the housing using a replaceable meltable item.

In order to accomplish the above-mentioned object, according to one aspect of the present disclosure, there is provided a lamp with a separable multi-housing. The lamp includes: a module that is an after-sale service target; and a housing having a housing body. The housing body forms an internal space in which the module is positioned and includes a hole formation portion formed on a rear surface of the housing body. A withdrawal hole may be formed in the hole formation portion and thus the module is taken out of the internal space through the withdrawal hole. In an embodiment, a lens is positioned on a front surface of the housing body, and the withdrawal hole (e.g., an opening) may be formed on the rear surface of the housing body. In particular, the housing body of the housing has a rear coupling portion that protrudes from an edge of the hole formation portion thereof.

In the lamp, a fracture portion may be formed in the hole formation portion when the withdrawal hole is not formed, and the fracture portion may be arranged in the shape of a groove or a slit, inward from the rear coupling portion, along an entire circumference of the hole formation portion.

In the lamp, the housing may be coupled to a multi-housing using a fastening structure of the rear coupling portion, and the fastening structure may be formed by securely holding a housing meltable item, which seals an opening in the rear coupling portion, in a state of surrounding the multi-housing.

In the lamp, the housing meltable item may be a rubber-based meltable item that is responsive, waterproof, and deconstructible.

In the lamp, the multi-housing may include: a frame body configured to have such a size to cover a rear surface of the housing body; a module holding portion protruding from a middle section of the frame body and positioned on the hole formation portion or in the withdrawal hole; and a housing protrusion protruding from an edge of the frame body and surrounded by the housing meltable item sealing the opening in the rear coupling portion.

In the lamp, the module may be securely held on the module holding portion.

In the lamp, a housing holding force enhancement structure may be employed to couple the housing and the multi-housing, and the housing holding force enhancement structure may be formed by: an auxiliary coupling portion protruding from an edge of the housing in the same direction as the rear coupling direction; a holding hole cut at a position, facing the auxiliary coupling portion, on the edge of the multi-housing; and a fastening member passing through the holding hole and engaged with the auxiliary coupling portion.

In the lamp, the auxiliary coupling portion and the fastening member may be fastened using one of the following: a screw, a snap-fit, or a hook.

In the lamp, a lens meltable item that seals an opening in a front coupling portion formed on the front surface of the housing body is used to securely hold the lens in the housing.

In the lamp, a lens protrusion that is surrounded by the lens meltable item may protrude from the lens.

In the lamp, the module may have a holding structure that uses the lens or the housing, and the holding structure of the module may be formed by: a lateral-side holding portion protruding from a circumference of the module; a module bracket positioned to one side of the lateral-side holding portion; and a fastening member passing through a hole in the lateral-side holding portion and engaged with the module bracket.

In the lamp, the lateral-side holding portion and the fastening member may be fastened to each other in a nut-bolt fastening manner, and an end portion of the lateral-side holding portion may be formed within the module bracket in a manner that faces toward the housing or the lens.

In order to accomplish the above-mentioned object, according to another aspect of the present disclosure, there is provided a vehicle including a lamp. The lamp includes: a lens transmitting light; a module that is an optical module or an electronic module that is an after-sale service target; and a housing which has a hole formation portion and a rear coupling portion and in which a lens meltable item, or a housing meltable item sealing an opening in the rear coupling portion is used. Furthermore, in the housing, on a front surface of an internal space accommodating the module, the lens meltable item is inserted into a front coupling portion, thereby securely holding the lens. Furthermore, in the housing, the hole formation portion is formed on a housing body blocking a rear surface of the internal space, and the module is taken out through the hole formation portion. Furthermore, in the housing, the rear coupling portion is formed on the hole formation portion or along an entire circumference of a withdrawal hole between the withdrawal hole and the housing body in such a manner as to have a protrusion structure.

In the vehicle, a fracture portion may be formed in the hole formation portion when the withdrawal hole is not formed, and the fracture portion may be arranged, inward from the rear coupling portion, along an entire circumference of the hole formation portion.

In order to accomplish the above-mentioned object, according to another aspect of the present disclosure, there is provided a vehicle including a lamp. The lamp includes: a lens transmitting light; a module that is an optical module or an electronic mode that is an after-sale service target; a housing which has a hole formation portion and a rear coupling portion and in which a lens meltable item, or a housing meltable item sealing an opening in the rear coupling portion is used; a multi-housing coupled to the rear coupling portion at the hole formation or the withdrawal hole in such a manner as to cover the withdrawal hole formed, as an opening, along the fracture portion; and a housing meltable item sealing the opening in the rear coupling portion and exerting a holding force against the housing in a state of surrounding a housing protrusion of the housing. Furthermore, in the housing, on a front surface of an internal space accommodating the module, the lens meltable item is inserted into a front coupling portion, thereby securely holding the lens. Furthermore, in the housing, the hole formation portion is formed on a housing body blocking a rear surface of the internal space, and the module is taken out through the hole formation portion. Furthermore, in the housing, the rear coupling portion is formed on the hole formation portion or along an entire circumference of a withdrawal hole between the withdrawal hole and the housing body in such a manner as to have a protrusion structure. Furthermore, in the housing, a fracture portion in the shape of a groove or a slit is arranged, inward from the rear coupling portion, in the hole formation portion.

In the vehicle, a fastening member for enhancing the holding force may be used to couple the housing and the multi-housing to each other, and the fastening member may pass through a holding hole cut at a position, facing an auxiliary coupling portion, on an edge of the multi-housing, and fastened in a nut-bolt fastening manner to the auxiliary coupling portion that protrudes from the edge of the housing in the same direction as the rear coupling portion.

In the vehicle, the module may include: a module bracket forming a holding structure together with the lens or the housing, and the module bracket may be fastened in a nut-bolt fastening manner to a fastening member that passes through a hole in a lateral-side holding portion protruding from a circumference of the module.

The lamp with the separable multi-housing according to the present disclosure, designed for use in vehicles, may not include a meltable item-associated housing structure for replacing the module inside the lamp, during the initial mass production. As a result, the following operational effects can be achieved while reducing the cost of mass production.

Firstly, a deconstructible portion of a hot meltable item is reduced in size using a combination of the housing and the multi-housing. As a result, only a malfunctioning module can be replaced whenever necessary. Particularly, an after-sale service operation can be performed on only one region, rather than all regions, of the lamp using a multi-housing structure. As a result of the after-sale service operation, a ratio of recyclable components can be increased, while simultaneously reducing the amount of meltable material.

Secondly, this increase in the ratio of recyclable components for the large-sized lamp with an increased number of components can achieve more environmentally friendly after-sale service.

Thirdly, the number of coupling structures, such as screws associated with the hot meltable item, in the housing can be reduced. Particularly, a range of regions required to be heated to high temperatures can be reduced. As a result, the time taken to remove the fastening structure between the lens and the housing can be shortened. Additionally, the time taken for reheating can be shortened because the reduction in the range of regions required to be heated to high temperatures shortens the time for heating and reduces the temperature of non-heated regions at room temperature.

Fourthly, the time for heating can be shortened when the temperature of non-heated regions that maintain a thermal equilibrium to a room temperature condition is decreased and needs to be heated to temperatures ranging from 70 to 80 degrees Celsius. As a result, when an after-sale service operation is performed on the lamp, there is no need to increase the number of heating guns for shortening the time for heating or to use a high-temperature chamber. Thus, the efficiency in the after-sale service can be significantly improved.

DETAILED DESCRIPTION

Some embodiments of the present disclosure are in detail described below with reference to the accompanying drawings. The embodiments are exemplary and may be practiced in various forms by a person of ordinary skill in the art to which the present disclosure pertains. Therefore, the present disclosure is not limited to the embodiments described below.

Figure 1:
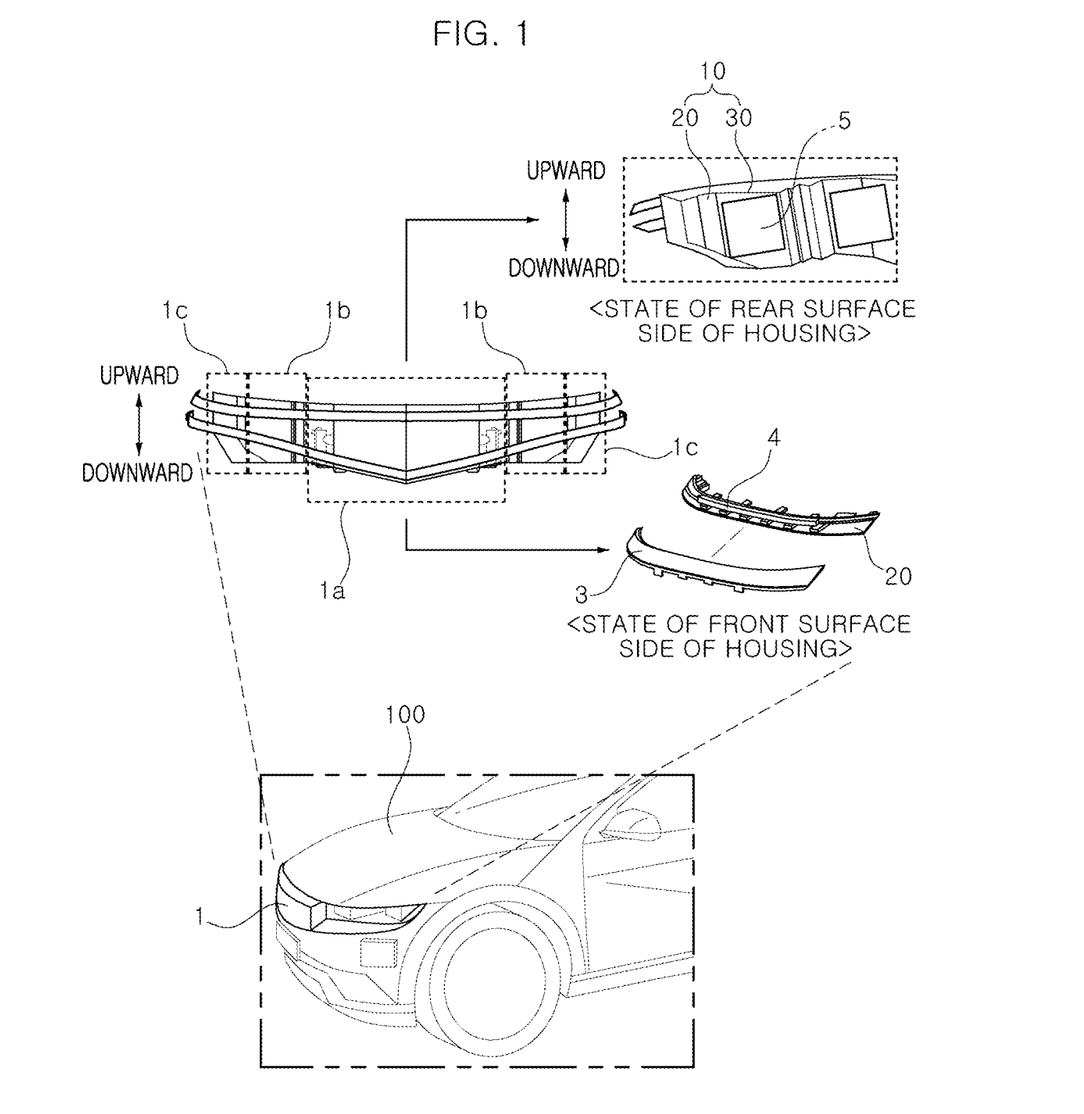
FIG. 1 is a view illustrating a configuration of a lamp having a separable multi-housing according to an embodiment of the present disclosure.

With reference to FIG. 1, a lamp 1 designed for use in a vehicle 100 is a large-sized front lamp, resulting from integrating lamps. The lamp 1 may have the same width as the vehicle 100 and have left and right sections with the center section in between. A center lamp 1a occupies the center section. Low/high beams 1b symmetrically occupy the left and right sections, respectively. In succession to the low/high beams 1b, turn indicators 1c symmetrically occupy the left and right sections, respectively. Examples of the lamp 1 include a cutlineless lamp.

Specifically, the lamp 1 includes a lens 3 transmitting light, a lens meltable item 4 serving as an adhesive, a module 5 generating light and controlling operation, and a housing assembly 10, which is a repair component for after-sale service.

As an example, the lens 3 is partitioned into regions for the center lamp 1a, the low/high beam 1b, and the turn indicator 1c. These regions transmit light. The lens meltable item 4, serving as an adhesive or a glue agent, couples or holds the lens 3 and a housing 20 together. A typical meltable item or a replaceable meltable item may be used as the lens meltable item 4.

In addition, the module 5 is an optical module or an electronic module. However, the module 5 may include a first-phase partial component, or a second-phase component that is modularized. The examples of the first-phase partial component include an IFS ECU, an ILCU, a SIGNAL LAM, and a fan, among components of the lamp 1. Examples of the second-phase component include a lens sub-assembly, a primary light source module, a signal light source module, and a housing sub-assembly.

As an example, the housing assembly 10 is configured to include a housing 20 and/or a multi-housing 30. The module 5 is provided in an internal space of the housing 20, and the lens 3 fixed by the lens meltable item 4 is provided on a front surface of the housing 20. The multi-housing 30 is positioned on a rear surface of the housing 20.

Figure 2:
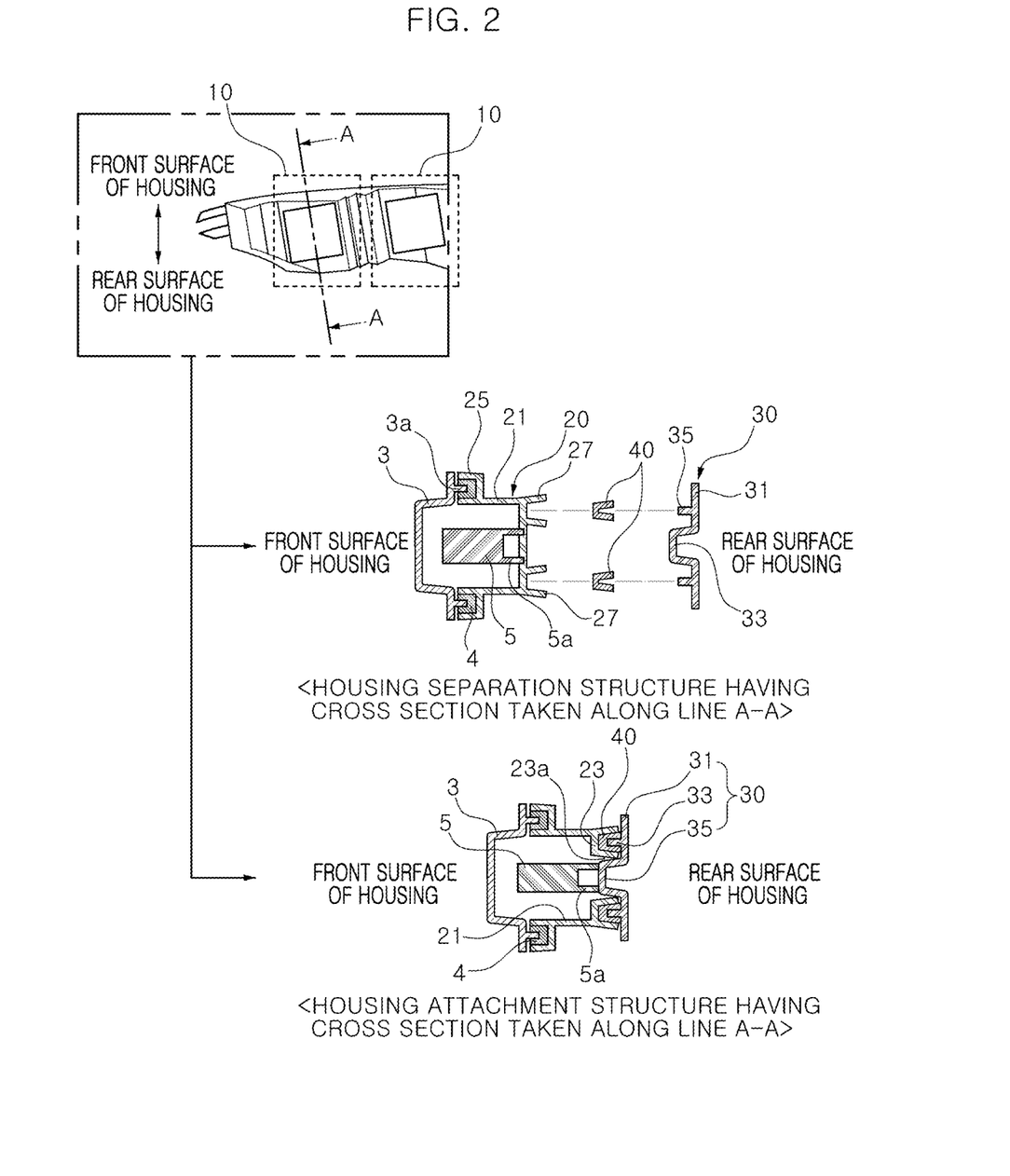
FIG. 2 is a view illustrating a configuration of the separable multi-housing according to an embodiment of the present disclosure.

FIG. 2 illustrates a structure in which the lens 3, the module 5, and the multi-housing 30 are coupled to the housing 20 that is a fundamental constituent element of the housing assembly 10.

Specifically, the lens 3 is coupled to the front surface of the housing 20, and the module 5 is positioned in the internal surface of the housing 20. The multi-housing 30 is coupled to the rear surface of the housing 20.

To this end, the housing 20 includes a housing body 21, a hole formation portion 23, a front coupling portion 25, and a rear coupling portion 27.

As an example, the housing body 21 is configured to have a size matching that of the lens 3. The internal space that is formed to be open at the front in the shape of approximately the Korean letter "ㄷ" or in the shape of a cup. The module 5 is accommodated within the internal space.

The hole formation portion 23 forms a blocking wall (e.g., a rear wall) of the housing body 21 and thus securely holds rear holding portions 5a protruding from a rear end of the module 5. In an embodiment, a withdrawal hole 23a is formed in the hole formation portion 23 to be broken during the after-sale service operation. The withdrawal hole 23a serves as an opening through which the module 5 is taken out of the housing 20. The withdrawal hole 23a is covered by a module holding portion 33 of the multi-housing 30 after the module 5 is replaced. In this case, the module holding portion 33 is provided, in a securely holding manner, on the rear holding portions 5a protruding from the rear end of the module 5.

As an example, the front coupling portion 25 is formed along an entire circumference, on the front surface side, of the housing 20 to form a channel structure that has a cross section in the shape of approximately the Korean letter "ㄷ" or in the shape of a cup that is open at the front. The lens meltable item 4, along with a lens protrusion 3a of the lens 3, is inserted into the front coupling portion 25. When heated, the lens meltable item 4 is melted, thereby coupling the lens 3 to the front coupling portion 25 and thus securely holding the lens 3.

Particularly, other methods, such as vibration fusion, ultrasonic fusion, laser fusion, and simultaneous emission fusion, may apply to the front coupling portion 25, without the use of the lens meltable item 4.

The rear coupling portion 27 is formed along an entire circumference, on the rear surface side, of the housing 20 to form a channel structure that has a cross section in the shape of approximately the Korean letter "ㄷ" or in the shape of a cup that is open at the front. A housing meltable item 40, along with a housing protrusion 35 of the multi-housing 30, is inserted into the rear coupling portion 27. When heated, the housing meltable item 40 is melted, thereby coupling the housing 20 to the multi-housing 30 and thus securely the housing 20.

The housing meltable item 40, serving as an adhesive, is inserted into the rear coupling portion 27. When heated, the housing meltable item 40 is melted, thereby coupling or holding the multi-housing 30 and the housing 20 together. This housing meltable item 40 may be a replaceable meltable item that is a rubber meltable item, for example. This replaceable meltable item is less responsive but waterproof, flexible, and deconstructible, compared with the lens meltable item 4, which is a typical meltable item.

Specifically, the multi-housing 30 is configured to include a frame body 31, the module holding portion 33, and the housing protrusion 35.

As an example, the frame body 31 is a plate with a predetermined thickness that is configured to have a size matching that the housing 20 to cover the rear surface of the housing 20. The module holding portion 33 is formed by causing the middle section of the frame body 31 to protrude in the forward direction (e.g., a one-side direction) in such a manner as to have the shape of the Korean letter "ㄷ" or the shape of a cup. The housing protrusion 35 has a rib structure in which it is spaced a predetermined distance apart from the module holding portion 33 and protrudes in such a manner as to be surrounded by the housing meltable item 40. The housing protrusion 35 with the rib structure is inserted into the channel structure of the rear coupling portion 27 of the housing 20. When the housing meltable item 40 is melted, the housing protrusion 35 is held securely.

In one embodiment, the housing assembly 10 has a housing separation structure, having a cross section taken along line A-A, in which the withdrawal hole 23a is not formed in the hole formation portion 23 of the housing 20 and a housing attachment structure, having the cross section taken along line A-A, in which the withdrawal hole 23a formed in the hole formation portion 23 of the housing 20 is covered by the module holding portion 33 of the multi-housing 30. With reference to these structures, in the housing assembly 10, the lamp 1 may be configured without coupling the multi-housing 30 to the housing 20 as in the housing separation structure having the cross section taken along line A-A. In addition, the lamp 1 may be configured with the multi-housing 30 being coupled to the housing 20 as in the housing attachment structure having the cross section taken along line A-A.

In other words, the multi-housing 30 is a repair component that is coupled to the housing 20 of which one portion is broken to perform an operation of replacing the module 5 and that reinforces the housing 20. The multi-housing 30 which is a repair component may constitute the lamp 1 after an after-sale service expires. Alternatively, after an after-sale service expires, the multi-housing 30 which is a new component may constitute the lamp 1 in a state where the multi-housing 30 is assembled in a housing-integrated manner and constitutes the lamp 1.

In addition, in a case where, as in the housing attachment structure having the cross section taken along line A-A, the housing assembly 10 is configured to already include the multi-housing 30 from before the after-sale service (i.e., from a point in time for mass production or when the second after-sale service is effective after the first after-sale service expires), an after-sale service cover with a different color, shape, or marking letter, or the housing meltable item 40 with a different color is used to facilitate a distinction from a new product and to check whether the after-sale service is effective. Accordingly, it is easy to verify whether or not a component in question is entitled to the after-sale service. In addition, it is easy to determine a proper range, such as a reduced range, for waterproof guarantee of a product that has the housing 20 and the multi-housing 30 that were separated and then coupled.

Therefore, the lamp 1 has the feature that components, constituting the lamp 1, are manufactured into second-phased partial components in alignment with a trend toward a large-sized lamp, such as a large-sized front lamp or a cutlineless lamp. In addition, the lamp 1 has the feature of being equipped with a separable multi-housing that allows for performing an operation on the multi-housing 30 from behind the rear surface of the housing 20 when an after-sale service is performed to replace an internal component.

Therefore, there is provided an advantage in that an after-sale service center that provides servicing or repairs for the lamp 1 does not need a high-temperate chamber, like an existing one, because the multi-housing 30 has the feature that does not require a recycling-enabling hot meltable item for coupling to the housing 20.

Figure 3:
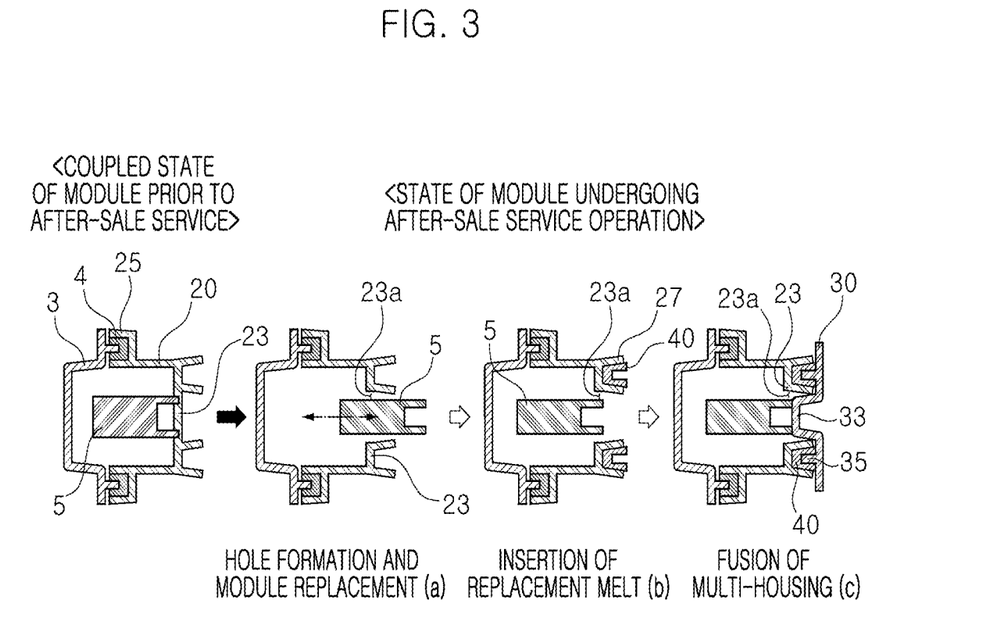
FIG. 3 is a view illustrating an example of an after-sale service operation that is performed on an after-sale service-target module of the lamp from behind a rear surface of a housing through a structure of the separable multi-housing according to an embodiment of the present disclosure.

FIG. 3 illustrates an after-sale service operation that is performed in a case where the housing assembly 10 has the housing separation structure having the cross section taken along line A-A in FIG. 2.

As illustrated, in the housing assembly 10, the module 5 changes from a state of being coupled (i.e., the state prior to the after-sale service operation) to a state for undergoing the after-sale service operation. In this state for undergoing the after-sale service operation, an operation of replacing the malfunctioning module 5 of the lamp 1 can be performed from behind the rear surface of the housing 20.

As an example, when the module 5 that is a replacement target is determined in the lamp 1, a position of the module 5 is identified from behind the rear surface of the housing 20. Then, the withdrawal hole 23a having a size matching that of the module 5 is cut in the hole formation portion 23 of the housing body 21 using a tool. The module 5 held securely in a cut-out portion of the hole formation portion 23 is taken out of the internal space in the housing 20. Then, a normal module 5 is positioned in an internal rib structure of the housing 20.

Subsequently, the housing meltable item 40 is inserted into the rear coupling portion 27 of the housing 20, and the module holding portion 33 of the multi-housing 30 is inserted into the internal space through the withdrawal hole 23a in such a manner that the module 5 is securely held on the rear holding portions 5a. Then, the frame body 31 is pushed toward the housing 20 in such a manner that the housing meltable item 40 surrounds the housing protrusion 35.

Subsequently, the rear coupling portion 27 of the housing 20 is heated by a heating tool (for example, a heating gun) until the housing meltable item 40 is melted. Thus, the after-sale service operation of replacing the module 5 can be completed. In this case, concerning the coupling between the rear holding portion 5a of the module 5 and the module holding portion 33 of the multi-housing 30, the module 5 is inserted into a groove in the module holding portion 33 to a predetermined depth in a state of being seated on a housing rib or a protrusion in the internal space in the housing 20. This insertion creates an additional holding force.

Therefore, in the case of the housing attachment structure having the cross section taken along line A-A in FIG. 2, in the after-sale service operation, an operation of melting the housing meltable item 40 using the heating tool (for example, the heating gun) is first performed in a state where the withdrawal hole 23a in the housing 20 is covered by the module holding portion 33, with the multi-housing 30 being coupled to the module 5.

Subsequently, after the housing meltable item 40 is melted, the multi-housing 30 is taken out. Thus, the multi-housing 30 and the housing 20 can be separated and simultaneously the module 5 can also be simply taken out.

Subsequently, a new module 5, the housing meltable item 40, and the multi-housing 30 are coupled to the rear surface of the housing 20, thereby completing the after-sale service operation.

Figure 4:
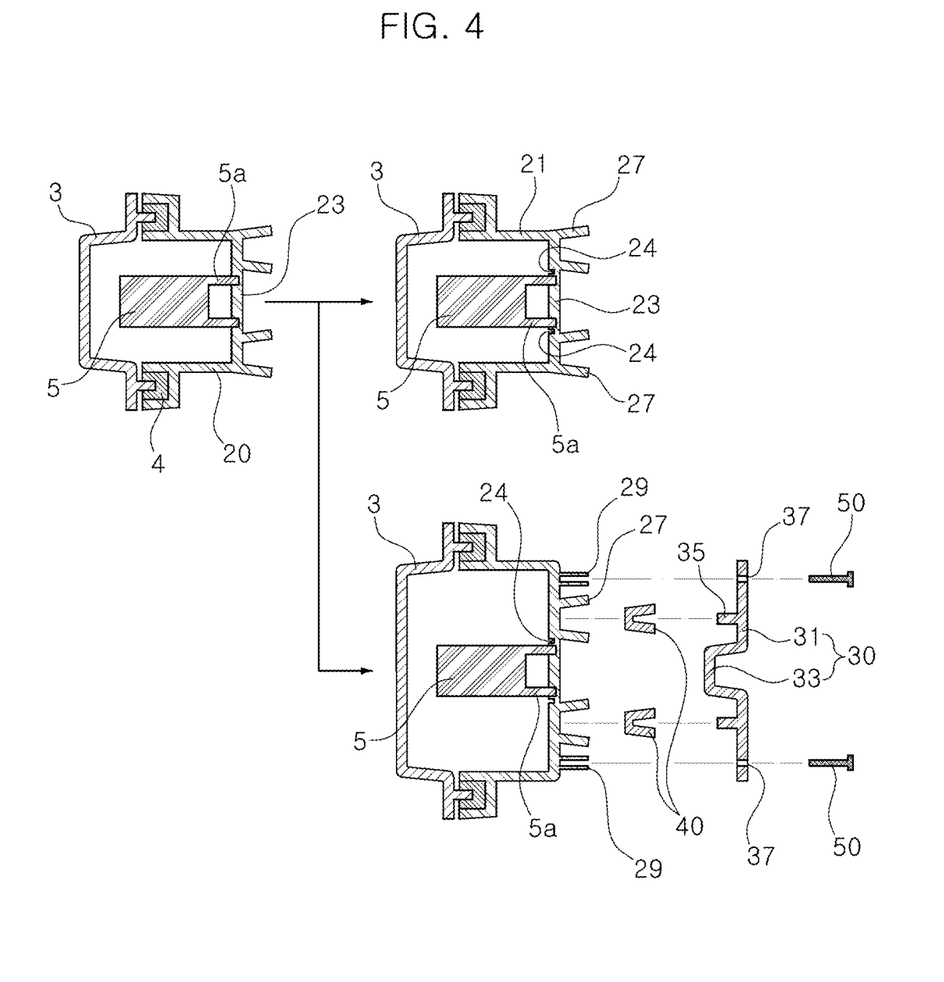
FIG. 4 is a view illustrating modification examples of the housing and the separable multi-housing according to an embodiment of the present disclosure.
Figure 5:
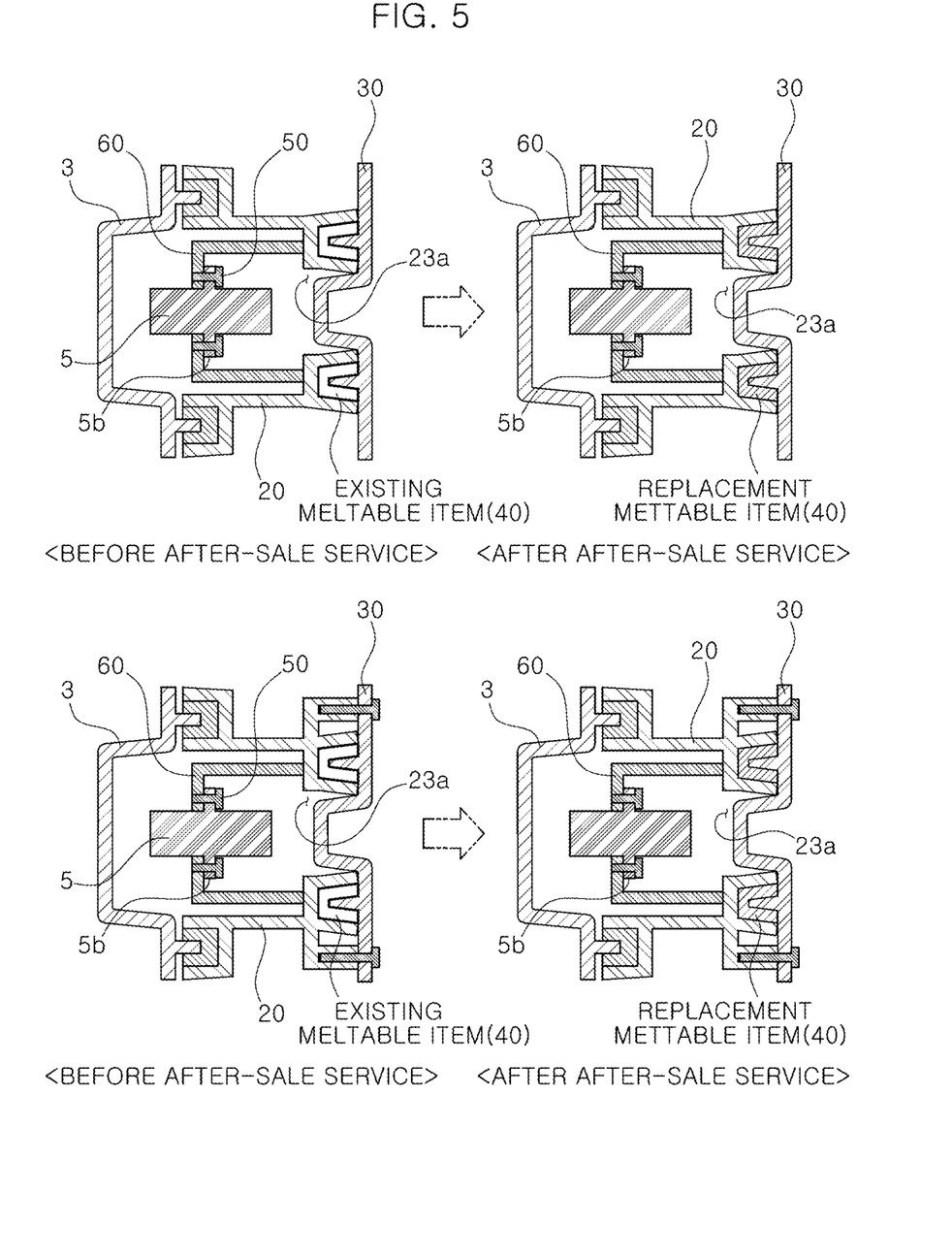
FIGS. 5 and 6 are views each illustrating a coupling structure employed for the lamp having the separable multi-housing according to an embodiment of the present disclosure.

FIG. 4 illustrates a deformation structure of each of the housing 20 and the multi-housing 30. FIG. 5 illustrates a coupled (attached) structure of the module 5.

With reference to FIG. 4, the deformation structure of each of the housing 20 and the multi-housing 30 may be categorized into an auxiliary deformation portion formation structure and a housing holding force enhancement structure.

As an example, in the auxiliary deformation portion formation structure, a fracture portion 24 is formed in the housing 20. The fracture portion 24 is in the shape of a hole or slit that is cut to a predetermined depth into the hole formation portion 23 of the housing body 21. In this case, the fracture portion 24 is a constituent element that is unnecessary when the withdrawal hole 23a is formed.

Particularly, the fracture portion 24 is cut into an internal or external surface of the hole formation portion 23 between the hole formation portion 23 and the rear coupling portion 27 and serves to facilitate the formation of the withdrawal hole 23a for replacing the module 5.

In the housing holding force enhancement structure, an auxiliary coupling portion 29 protrudes from the housing 20, a holding hole 37 is cut in the multi-housing 30, and a fastening member 50 is provided. The auxiliary coupling portion 29 has a protrusion structure that has an internally threaded surface. The fastening member 50 is configured to have an externally threaded surface similar to that of a bolt or a screw. The fastening member 50 passes through the holding hole 37, and the externally threaded surface thereof is engaged with the internally threaded surface of the auxiliary coupling portion 29. In this case, a nut-bolt fastening structure may be changed to a fastening structure that uses a snap-fit assembly or a hook.

Particularly, the auxiliary coupling portion 29 is integrally formed with the housing body 21 in such a manner as to be positioned above the rear coupling portion 27. Thus, the holding force that couples the housing 20 and the multi-housing 30 can be enhanced in a state where the housing 20 and the multi-housing 30 are coupled using a holding force due to the melting of the housing meltable item 40 and a nut-bolt fastening force due to the fastening member 50.

Figure 6:
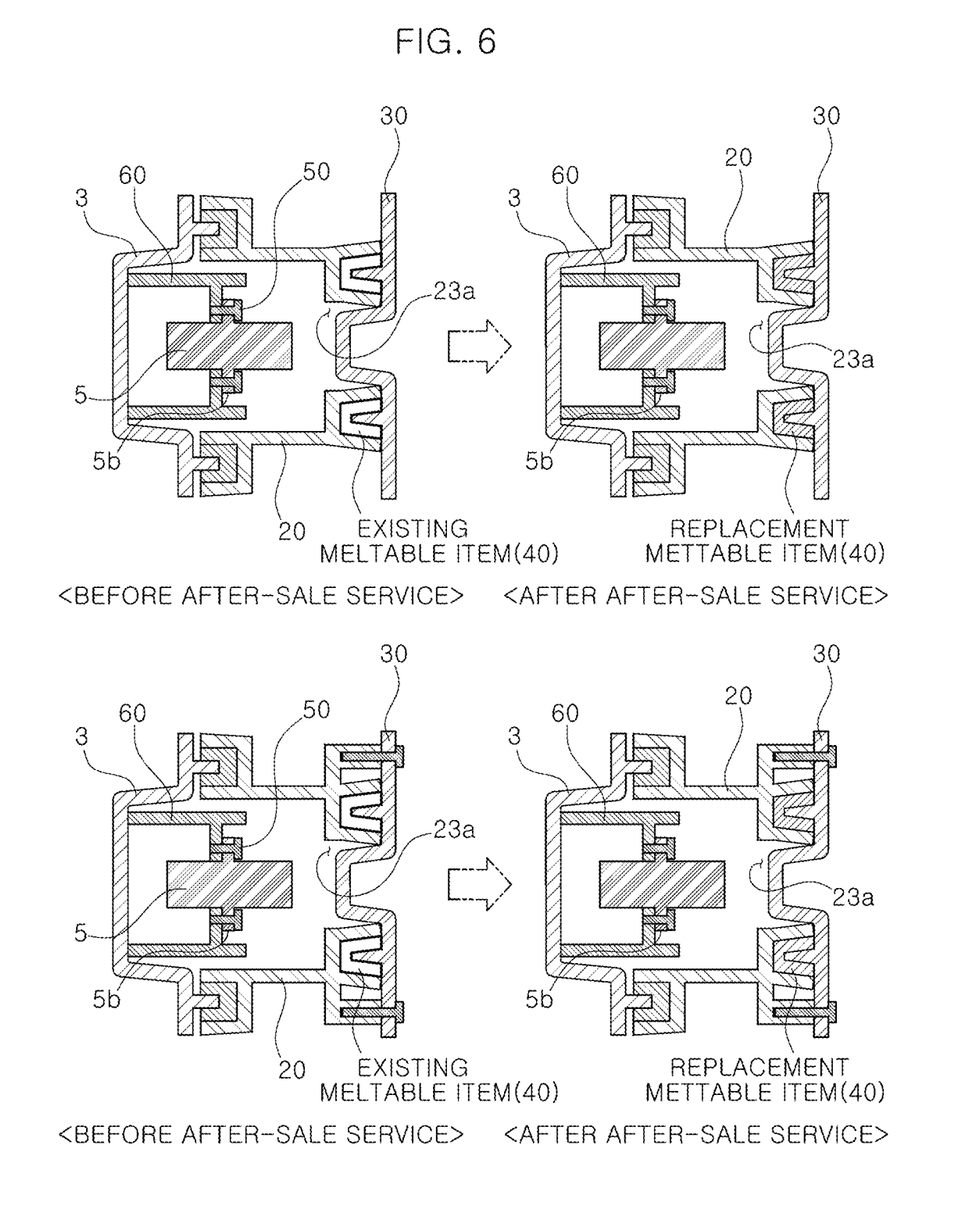

With reference to FIGS. 5 and 6, the lens 3 or the housing 20 may employ the coupling structure (or the attachment structure) of the module 5 that is an after-sale service target. Accordingly, since the housing meltable item 40 is a replaceable meltable item, there can be provided an advantage in that the multi-housing 30 can be reused after the module 5 is replaced. However, in a case where the multi-housing 30 is reused, there is a need for the housing meltable item 40 to vary in color before and after the after-sale service operation is performed. Thus, it can be identified whether or not the lamp 1 is entitled to the after-sale service.

To this end, a lateral-side holding portion 5b, the fastening member 50, and a module bracket 60 are provided for the coupling structure (or the attachment structure) of the module 5.

As an example, the lateral-side holding portion 5b has such a rib structure that it has a hole with an internally threaded surface and protrudes from a circumference of the module 5. This rib structure necessitates the removal of the rear holding portions 5a from the module 5. The fastening member 50 is configured to have an externally threaded surface similar to that of a bolt or a screw. The externally threaded surface thereof is engaged with the internally threaded surface of the lateral-side holding portion 5b.

As an example, the module bracket 60 is configured to be open at one side in the shape of approximately the Korean letter "ㄷ." The open one side is blocked by a sidewall. Alternatively, the module bracket 60 is configured to be open at both sides with the middle wall in between in the shape of the letter "H." The length of one side is shorter than the length of the other side.

FIG. 5 illustrates a housing coupling structure resulting from replacing the module 5, and FIG. 6 depicts a lens coupling structure resulting from replacing the module 5. As illustrated, the module 5 can be fixed on the sidewall or middle wall of the module bracket 60 using the fastening member 50 that is engaged with the lateral-side holding portion 5b. The module bracket 60 can be coupled to the housing 20 by inserting one end portion of the module bracket 60 into a groove formed in one portion, other than the withdrawal hole 23a, of an internal surface of the hole formation portion 23 of the housing 20. Alternatively, the module bracket 60 can be coupled to the lens 3 by inserting one end portion of the module bracket 60 into a groove formed in an internal surface of the lens 3.

Therefore, the coupling structure (or the attachment structure of the module 5) makes the housing 30 reusable. As a result, the housing meltable item 40, when reused after being removed, is set to have a different color. This facilitates identification of whether or not the after-sale service operation was performed.

As described above, the lamp 1 is equipped with the separable multi-housing 30 according to the present embodiment and mounted in the vehicle 100. The lamp 1 includes the housing 20. The housing 20 has the hole formation portion 23 and the rear coupling portion 27 on the rear surface of the housing body 21. An internal space in the housing body 21 in which the module 5 (i.e., an after-sale service target) is positioned is covered by the lens 3. A light source unit can be securely held on the hole formation portion 23, and the module 5 is taken out through the hole formation portion 23. The rear coupling portion 27 is formed along an entire circumference of the hole formation portion 23 at an edge of the housing body 21 in such a manner as to have a protrusion structure. With this configuration of the lamp 1, the after-sale service operation of replacing the module 5 can be performed through the hole formation portion 23. Particularly, the multi-housing 30 can be coupled to the rear coupling portion 27 using the replaceable housing meltable item 40, thereby covering the hole formation portion 23. As a result, a lamp constituent element, such as the malfunctioning module 5, can be replaced without requiring a heating operation for the recycling-enabling hot meltable item.

What is claimed is:

1. A lamp with a separable multi-housing, the lamp comprising:
 a module; and
 a housing including:
   a housing body forming an internal space in which the module is positioned,
   a hole formation portion formed on a rear surface of the housing body and configured to have a withdrawal hole through which the module is taken out of the internal space, and
   a rear coupling portion protruding from an edge of the hole formation portion,
   wherein a lens is positioned on a front surface of the housing body,
   wherein the housing is coupled to a multi-housing using a fastening structure of the rear coupling portion, and
   wherein the fastening structure is formed by securely holding a housing adhesive, which seals an opening in the rear coupling portion, in a state of surrounding the multi-housing.

2. The lamp of claim 1, wherein the withdrawal hole is changed to a fracture portion in the hole formation portion, and
 wherein the fracture portion is arranged inward from the rear coupling portion.

3. The lamp of claim 2, wherein the fracture portion is in a shape of a groove or a slit.

4. The lamp of claim 1, wherein the housing adhesive is a rubber-based meltable item that is responsive, waterproof and deconstructible.

5. The lamp of claim 1, wherein the multi-housing comprises:
 a frame body covering a rear surface of the housing body;
 a module holding portion protruding from a middle section of the frame body and positioned on the hole formation portion or in the withdrawal hole; and
 a housing protrusion protruding from an edge of the frame body and surrounded by the housing adhesive sealing the opening in the rear coupling portion.

6. The lamp of claim 5, wherein the module is securely held on the module holding portion.

7. The lamp of claim 1, wherein a housing holding force enhancement structure is employed to couple the housing and the multi-housing.

8. The lamp of claim 7, wherein the housing holding force enhancement structure is formed by:
 an auxiliary coupling portion protruding toward the rear coupling portion from an edge of the housing;
 a holding hole cut at a position, facing the auxiliary coupling portion, on the edge of the multi-housing; and
 a fastening member passing through the holding hole and engaged with the auxiliary coupling portion,
 wherein the auxiliary coupling portion and the fastening member are fastened to each other in a nut-bolt fastening manner.

9. The lamp of claim 1, wherein a lens adhesive is configured to seal an opening in a front coupling portion formed on the front surface of the housing body and configured to securely hold the lens in the housing.

10. The lamp of claim 9, wherein a lens protrusion that is surrounded by the lens adhesive protrudes from the lens.

11. The lamp of claim 1, wherein the module has a holding structure for the lens or the housing, and
 wherein the holding structure of the module is formed by:
 a lateral-side holding portion protruding from a circumference of the module;
 a module bracket positioned to one side of the lateral-side holding portion; and
 a fastening member passing through a hole in the lateral-side holding portion and engaged with the module bracket.

12. The lamp of claim 11, wherein the lateral-side holding portion and the fastening member are fastened to each other in a nut-bolt fastening manner.

13. The lamp of claim 11, wherein an end portion of the lateral-side holding portion is formed within the module bracket in a manner that faces toward the housing or the lens.

* * * * *